(12) United States Patent
Murgod et al.

(10) Patent No.: US 12,420,684 B2
(45) Date of Patent: Sep. 23, 2025

(54) CONNECTOR FOR THERMAL SYSTEM OF A VENTILATED VEHICLE SEAT

(71) Applicant: GENTHERM GMBH, Odelzhausen (DE)

(72) Inventors: Ajay Murgod, Novi, MI (US); Harsh Harilal Patel, Novi, MI (US); Eddy Orig, Lasalle (CA)

(73) Assignee: GENTHERM GMBH, Odelzhausen (DE)

( * ) Notice: Subject to any disclaimer, the term of this patent is extended or adjusted under 35 U.S.C. 154(b) by 445 days.

(21) Appl. No.: 18/022,183

(22) PCT Filed: Sep. 2, 2021

(86) PCT No.: PCT/IB2021/000599
§ 371 (c)(1),
(2) Date: Feb. 20, 2023

(87) PCT Pub. No.: WO2022/069934
PCT Pub. Date: Apr. 7, 2022

(65) Prior Publication Data
US 2023/0322134 A1    Oct. 12, 2023

Related U.S. Application Data

(60) Provisional application No. 63/084,748, filed on Sep. 29, 2020.

(51) Int. Cl.
*B60N 2/56*    (2006.01)
(52) U.S. Cl.
CPC ......... *B60N 2/5642* (2013.01); *B60N 2/5657* (2013.01)

(58) Field of Classification Search
CPC ............................ B60N 2/5642; B60N 2/5657
See application file for complete search history.

(56) References Cited

U.S. PATENT DOCUMENTS

| | | |
|---|---|---|
| 6,003,950 A | 12/1999 | Larson |
| 6,048,024 A | 4/2000 | Wallman |
| 7,735,932 B2 | 6/2010 | Lazanja et al. |
| 7,862,113 B2 | 1/2011 | Knoll |
| 10,710,480 B2 | 7/2020 | Iacovone et al. |
| 2002/0096915 A1* | 7/2002 | Haupt ................. B60N 2/5635 297/180.13 |
| 2007/0188007 A1* | 8/2007 | Lazanja ............... B60N 2/5685 297/452.42 |

(Continued)

FOREIGN PATENT DOCUMENTS

WO    2009/015235 A1    1/2009

OTHER PUBLICATIONS

International Search Report and Written Opinion dated Jan. 18, 2022, for International Application PCT/IB2021/000599.

*Primary Examiner* — Ko-Wei Lin
(74) *Attorney, Agent, or Firm* — The Dobrusin Law Firm, P.C.

(57) ABSTRACT

A thermal system for a vehicle seat. The thermal system includes a seat insert: a connector having a first portion at least partially located within the seat insert; and an air mover connected to the seat insert via the connector. The air mover is adapted to generate an air flow within the insert. The first portion of the connector includes one or more air directors within the insert that are configured to change a direction of the air flow within the insert.

20 Claims, 4 Drawing Sheets

(56) References Cited

U.S. PATENT DOCUMENTS

| | | |
|---|---|---|
| 2009/0218855 A1 | 9/2009 | Wolas |
| 2019/0135145 A1* | 5/2019 | Zhang .................. B60N 2/5621 |
| 2019/0337428 A1 | 11/2019 | Kim et al. |
| 2020/0039397 A1* | 2/2020 | Shiga .................. B60N 2/5657 |
| 2021/0101509 A1* | 4/2021 | Hoshi .................. B60N 2/5628 |
| 2021/0268944 A1* | 9/2021 | Hoshi .................. B60N 2/5657 |

* cited by examiner

CONNECTOR FOR THERMAL SYSTEM OF A VENTILATED VEHICLE SEAT

CROSS REFERENCE TO RELATED APPLICATIONS

This application is a US National Stage of PCT/IB2021/000599 filed on Sep. 2, 2021, which claims priority to U.S. 63/084,748 filed on Sep. 29, 2020, the entireties of which are hereby incorporated by reference herein for all purposes.

FIELD

These teachings relate generally to a ventilated vehicle seat, and more particularly to a thermal system having a connector for connecting together an air mover and a seat insert.

BACKGROUND

Some vehicles or vehicle seats include one or a number of features for improving occupant comfort. For example, some vehicles or vehicle seats include a thermal system for moving air towards or away from an occupant.

While some currently available systems are adequate for their intended purpose, it may be desirable to improve the current state of the art. For example, it may be desirable to have a thermal system for a vehicle seat that includes a connector for connecting together an air mover and a seat insert. It may be advantageous to have a connector that can assist with guiding an air flow through the seat insert and into a housing of an air mover to reduce noise, vibrations, and/or pressure losses.

SUMMARY

These teachings provide a thermal system that includes a connector for connecting together an air mover and a seat insert. The thermal system according to these teachings has reduced pressure losses due to the implementation of one or more air directors directing or guiding an air flow into the housing of an air mover. The air directors are configured to bend, change, or redirect the air flow moving through the seat insert and guiding the air flow into the air mover so that the air flow is laminar, which thus reduces noise, vibrations, and/or pressure losses in the system. The connector according to these teachings also reduces or minimizes compression or collapse of the seat insert due to a load acting on the seat or seat insert.

The thermal system for a vehicle seat according to these teachings includes a seat insert; a connector having a first portion at least partially located within the seat insert; and an air mover connected to the seat insert via the connector. The air mover is adapted to generate an air flow within the insert. The first portion of the connector includes one or more air directors within the insert that are configured to change a direction of the air flow within the insert.

These teachings provide a connector for connecting an air mover to a seat insert of a vehicle seat. The connector includes a first portion and a second portion. The first portion includes one or more air directors configured to change a path of air flow within the seat insert. The first portion comprises a flange for attaching to a first layer of the insert. The second portion is configured to be received in the seat insert and includes comprising a flange for attaching to a second layer of the insert and an air mover connection feature for engaging the air mover.

These teachings provide thermal system comprising a connector. The thermal system comprises a seat insert, which comprises the first layer, a middle layer, and the second layer. The first layer comprises one or more ventilation apertures and a first layer connector aperture. The middle layer comprises a middle layer connector aperture, and the second layer comprises a second layer connector aperture. The first layer connector aperture, the middle layer connector aperture, and the third layer connector aperture are arranged along a common axis.

DETAILED DESCRIPTION

These teachings provide a thermal system. Some examples of systems are disclosed in U.S. Pat. Nos. 6,003,950; 6,048,024; 7,735,932; and 7,862,113 all of which are expressly incorporated herein by reference for all purposes.

The thermal system according to these teachings may function to create or increase an air flow relative to a seat, occupant, or object in the seat, or both. For example, the thermal system may function or be used to distribute or spread an air flow that is supplied by one or more air movers to one or more locations of a seat or occupant in the seat when the air mover and/or the thermal system is operating in a push mode (i.e., when air is pushed, exhausted, and/or blown out towards the seat or an occupant in the seat). The air flow may be conditioned, meaning the air flow may be warmer than ambient air or cooler than ambient air. The air flow may be free from any conditioning, meaning the air is generally an ambient air temperature inside of the vehicle or surrounding the vehicle.

The thermal system may function or be used to gather, pull, suck, draw, or collect air from one or more locations of the seat or portions thereof via one or more air movers when the air mover and/or the thermal system is operating in a pull or suck mode (i.e., when air is being sucked or drawn away from the seat or an occupant in the seat).

The thermal system may function or be used to recirculate air relative to the seat or occupant in the seat. This means that an air flow may be sucked, drawn, or pulled from the seat area and then blown back towards the seat or occupant in the seat in the same area or in a different area. The air that is blown back towards the seat or occupant may be conditioned (warmed or cooled) or may be ambient air temperature.

One or more thermal systems or inserts according to these teachings may be integrated into or attached to one or more carriers (e.g., members, structures, panels, floors, walls, or the like) of various articles of manufacture such as buildings, furniture, transportation vehicles, (e.g., boats, trains, airplanes, motorcycles, all-terrain vehicles, busses, snowmobiles, or otherwise) or the like. Alternatively, one or more thermal systems or inserts may be integrated into or attached to various components of transportation vehicles such as seats, benches, panels, footwells, floor mats, or other components. Preferably, one or more thermal systems or inserts are integrated into a vehicle seat, which may be a front side or a rear side of a vehicle seat.

The thermal system or insert may be particularly suitable for integration into a seat of an automotive vehicle. More particularly, the thermal system is suitable for integration with the seat portion with or without bolsters, a back portion with or without bolsters, a head rest portion, or a combination thereof. The thermal system or insert may be located between two layers of the seat. The thermal system or insert may be located under a fabric layer (e.g., cloth, leather, synthetic leather. The thermal system or insert may be located under or on top of a cushion (e.g., a foam support for the user).

The thermal system is particularly attractive for use in combination with a conditioned seat (e.g., a ventilated, actively cooled (such as by use of a thermoelectric device or module), or actively heated seat). The thermal system or insert may be integrated with the seat cover by way of sewing, gluing, fasteners, or other methods. The thermal system may be integrated with the seat foam support by way of molding, gluing, or other attachment methods. Preferably, the thermal system or insert is included underneath the cushion of the seat and the cushion assists in distributing air from the thermal system to an occupant, predetermined locations, or both. The thermal system or insert may adaptably move with the vehicle seat, the cushion, a top layer of the cushion, or a combination thereof.

The thermal system may comprise one or more of the following: one or more inserts, one or more air movers to cause air to move, one or more heaters or heating elements to heat or raise a temperature of the air flow, one or more air conditioners to cool or lower a temperature of the air flow, one or more occupant sensors to detect present of an object or occupant in or near the seat, one or more thermoelectric devices, or a combination thereof.

The thermal system may include one or more seat inserts. The seat insert may also be referred to herein as an insert, bag, bag structure, or a combination thereof.

The insert may function or be used to distribute or spread an air flow that is supplied by one or more air movers to one or more locations of a seat when the air mover and/or the thermal system is operating in a push mode (i.e., when air is pushed, exhausted, and/or blown out towards the seat or an occupant in the seat). The insert may function or be used to gather, pull, suck, draw, or collect air from one or more locations of the seat or portions thereof via one or more air movers when the air mover and/or the thermal system is operating in a pull or suck mode (i.e., when air is being sucked or drawn away from the seat or an occupant in the seat).

The insert may comprise one or more layers or sheets. For example, the insert may have a top layer or sheet and a bottom layer or sheets. The top and bottom layers may be connected together to form a bag structure having an open space therein or therebetween. The top and bottom layers may be connected together at their peripheries to form the bag structure. The top and bottom layers may be connected by welding, laminating, fasteners like tape or the like. The insert may include one or more additional layers inside of the open space or bag structure (i.e., one or more middle layers, air movers, air conditioners (to warm and/or cool air), one or more connectors or connector portions described herein, one or more occupant sensors, or a combination thereof.

The insert and/or one or more layers of the insert may be sufficiently flexible so that the insert can adapt to movement of the seat and/or components thereof when an occupant or load is in the seat. The insert and/or one or more layers of the insert may be sufficiently flexible so that the insert can adapt to various geometry of the seat and/or seat components to which the insert is attached, in contact with, and/or adjacent to. The insert and/or one or more layers of the insert may be sufficiently strong to resist puncturing or tearing. The insert and/or one or more layers of the insert may be sufficiently rigid to maintain structure of the insert and/or to restrict or prevent bucking or collapse of the insert, which may restrict or prevent air from passing therethrough.

The seat insert, the one or more layers of the seat insert, and/or the thermal system may insert may include one or more attachment features. The one or more attachment features may be used to attach, connect, or otherwise secure the seat insert, the thermal system or both to a vehicle seat, a frame or cushion of the vehicle seat, or any other portion of the vehicle seat and/or vehicle. The one or more attachment features may include one or more tabs, eyelets, fasteners, prongs, barbs, push pins, hook and loop fasteners, screws, rivets, or the like.

The insert may include one or more top layers. The top layer may be air impermeable, except for one or more ventilation apertures and/or connector apertures defined in the top layer through which air is directed into and/or expelled out of the insert.

The top layer may be formed a single layer or one or more layers. The top layer may be made of any suitable material. For example, the top layer may be made of a polymeric material. The top layer may be made of polyester, biaxially oriented polyethylene terephthalate, polyvinyl fluoride, polyethylene, polypropylene, polyurethane, nylon, polyvinyl chloride, or a combination thereof. The top layer may be made of the same material as the bottom layer and/or middle layer. The top layer may be made of a different material than the bottom layer and/or middle layer.

The top layer may include one or more ventilation apertures. The one or more ventilation apertures may be one or more apertures defined in the top layer through which air is directed into and/or expelled out of the insert. All of the ventilation apertures may have the generally the same size and/or shape. One or more of the ventilation apertures may have a size and/or shape that is different than other ventilation apertures. A ventilation aperture may be an absence of material in the top layer. A ventilation aperture may be an air permeable portion of the top layer and thus not a complete absence of material. A ventilation aperture may be a netting or other air permeable member attached or integrated into the top layer. A ventilation aperture may be a cutout, slit, void, aperture, or the like. The ventilation apparatuses may be located anywhere on the top layer or insert. For example, all of the ventilation apertures may be located at one end or one side of the top layer or insert or may be randomly oriented. The one or more ventilation apertures may be located on the side area at or near the peripheries where the top and bottom layers are sealed together to form the bag structure. In some configurations, the middle and/or bottom layers may include one or more ventilation apertures.

The top layer may include one or more top layer connector apertures. A top layer connector. A top layer connector aperture may function to provide an area or region into which or through which a portion of the connector may be located or received. The top layer connector aperture may be located at one end of the top layer or insert, and the one or more ventilation apertures may be located at an opposite end of the top layer or insert. In some configurations, the top layer connector aperture may be surrounded by the ventilation apertures. A size of the top layer connector aperture may be the same as a size of one or more of the ventilation apertures. A size of the top layer connector aperture may be larger or smaller than a size of one or more of the ventilation apertures. The size of the top layer connector aperture is sufficient to allow the central region of the connector (i.e., of the first portion or top portion of the connector), the one or more air directors, or both to pass therethrough. The size of the top layer connector aperture is sufficient to restrict or prevent the flange of the first portion of the connector from passing therethrough. The size of the top layer connector aperture is sufficient to allow the flange of the first portion of the connector to contact the top layer and/or be attached to the top layer. The size of the top layer connector aperture is sufficient to allow the flange of the first portion of the connector to contact the top layer and/or be attached to the top layer to prevent air from passing through the connection aperture after the flange of the first portion of the connector is sealed or attached thereto.

A top layer connector aperture may have virtually any shape (circular, oval, square, triangle, diamond, irregular, etc.).

The insert may include one or more top layers. The middle layer may function to create and/or maintain the open space between the top layer and the bottom layer. The middle layer may prevent the bottom layer and the top layer from being moved into contact, crushed, or collapsed due to a weight of an occupant or object acting on the seat, insert, or thermal system. The middle layer may be a mesh material. The middle layer may resist compression. The middle layer may form a space for air to move through the insert. One example of a material of the middle layer is 3Mesh® spacer material manufactured by Mueller Textile of Wiehl, Germany. The middle layer may be one or more layers of material. The middle layer is a single layer of material that is located between the top layer and the bottom layer of the insert. The middle layer may comprise one or more channels, projections, baffles, diverters, guides etc. to assist with guiding or directing air moving through the bag structure between the one or more ventilation apertures and the one or more air movers.

The middle layer may comprise one or more middle layer apertures. The middle layer aperture may be a region or area of the middle layer that allows air to pass through the middle layer. The middle layer aperture may be an absence of material in the middle layer. The middle layer aperture may be a screen, netting, or otherwise air permeable material of the middle layer that allows air to pass through. The middle layer aperture may avoid the middle layer from obstructing, inhibiting, interfering, or otherwise contacting the impeller of the air mover. The middle layer aperture may be sized sufficiently to allow at least a portion of one or more of the connectors to pass through. For example, the middle layer aperture may be sized to allow one or more of the air directors to pass or extend through the middle layer aperture.

The insert may include one or more bottom layers. The bottom layer may be formed a single layer or one or more layers. The bottom layer may be made of any suitable material. For example, the bottom layer may be made of a polymeric material. The bottom layer may be made of polyester, biaxially oriented polyethylene terephthalate, polyvinyl fluoride, polyethylene, polypropylene, polyurethane, nylon, polyvinyl chloride, or a combination thereof. The top layer may be made of the same material as the bottom layer or middle layer. The bottom layer may be made of a different material than the top layer or middle layer. The bottom layer may cooperate with the top layer to form the bag structure. The bottom layer may be connected to the top layer and/or the middle layer to form the bag structure.

The bottom layer may include one or more bottom layer connector apertures. A bottom layer connector aperture may function similarly to a top layer connector aperture. A bottom layer connector aperture may function to provide an area or region into which or through which a portion of the connector may be located or received. The size of the bottom layer connector aperture is sufficient to allow the central region of a portion of the connector (i.e., the first portion or second portion of the connector) to pass therethrough. The size of the connection aperture is sufficient to restrict or prevent the flange of the second portion of the connector from passing therethrough. The size of the connection aperture is sufficient to allow the flange of the second portion of the connector to contact the bottom layer and/or be attached to the bottom layer.

The size of the connection aperture defined in the top layer and the bottom layer may be sufficiently the same. In some configurations, the connection aperture in the bottom layer may be smaller than the connection aperture in the top layer, or vice versa. In the assembled configuration, the connection aperture in the top layer may be generally aligned with the connection aperture in the bottom layer (i.e., aligned along a common axis). In other configurations, the connection aperture in the top layer may be offset or not aligned along a common axis relative to the connection aperture on the bottom layer.

The thermal system, the insert, or both may comprise one or more connectors. The connector may be or may function to provide an interface, point, region, or connection means for connecting the one or more air moves to the insert, the one or more layers of the insert, the thermal system, or a combination thereof.

The connector may be or may function to define or create a duct, passageway, or other guiding means for guiding or directing an air flow through the insert, through or between the one or more layers of the insert, between the air mover and the open space defined in the insert and/or bag structure, or a combination thereof. The duct, passageway, or guiding means may be created when the two portions of the connector are joined together or attached to the insert. The duct, passageway, or guiding means may guide the air flow from the air mover into the open space in the seat insert or bag structure. The duct, passageway, or guiding means may guide the air flow to flow between the top layer and the middle layer, between the middle layer and the bottom layer, or a combination thereof.

The connector may function to twist, move, curve, bend, or guide the air flow towards a central axis of the connector, the apertures in the insert, the inlet/outlet of the air mover, or a combination thereof. The air flow may be bent or twist to help minimize or eliminate the air flow from directly hitting any planar walls on the insert, the connector and/or the impeller of the air mover, which may undesirably cause noise, vibrations, and/or pressure losses.

The connector may function to direct an air flow moving through the insert to and/or from the air mover such that the air flow is laminar. This may assist with increasing air flow and/or performance of the thermal system. This may assist with lowering noise and/or vibrations caused by the air moving through the insert.

The connector may function to restrict or prevent compression or collapse of the insert and/or the open space defined in the insert. In other words, the connector may function to prevent the top layer from contacting the middle layer, the middle layer from contacting the bottom layer or a combination thereof.

The connector may include one or more pieces, which may be referred to herein as portions (i.e., first portion, second portion, etc.). The connector may be a 2-piece connector. It is within the scope of this disclosure that the connector can be configured in a manner to be a single piece (i.e., a single portion).

The connector may include a first portion. The first portion may be referred to as a top portion. The first portion may function to close or seal the top connector aperture defined in the top layer of the aperture. The first portion may be cup shaped, saucer shaped, bowl shaped etc. The first portion may include a flange and a central region.

The flange may be used for attaching or connecting the first portion, the connector, or both to the insert, the top layer, of both. The flange may be connected to the insert or top layer via one or more adhesives, fasteners, welding, RF welding, pins, rivets, glues, snaps, or a combination thereof. The flange may be connected to the top or outer surface of the first layer or to the bottom or inner surface of the first layer (i.e., in the open space).

The central portion may be generally free of any apertures. However, in some configurations, the central region of the first portion may include one or more ventilation apertures.

The flange and the central region may be located different planes. However, in some configurations, the flange and the central region may be located in the same plane, meaning the first portion of the connector is generally flat. The flange and the central region may be connected together with a wall. When the flange and central region are located in the same plane, the wall connecting the flange and central portion is substantially flat. However, the wall may also be curved, stepped, angled, or sloped.

The wall may be a sloped wall. The wall may slope inwardly towards a central axis, which may be the same axis as the axis that all connector apertures defined in the layers of the insert are aligned with. The sloped wall may be at an angle of about 15 degrees or more between the flange and the central region, 30 degrees or more, 45 degrees or more, 60 degrees or more. The sloped wall may have one or more steps between the flange and the central region, or the sloped wall may be generally smooth.

On a backside of the sloped wall (i.e., a side of the wall that is on the same side of the flange that is attached to the top layer), the connector or first portion includes one or more air directors. In some configurations, the one or more air directors may additionally, or instead, be located in the central region, the flange, or both.

The connector, the first portion, or the second portion may include one or more air directors. The one or more air directors may function to guide, change, direct, twist and/or redirect an air flow path within the insert. The one or more air directors may twist, redirect, obstruct, or otherwise change a flow direction of the moving air within the insert or open space of the insert.

The one or more air directors may be one or more vanes, fins, projections, ribs, or other members. The one or more air directors may extend radially from a central axis or region of the first portion or connector. The one or more air directors be generally straight or planar. The one or more air directors may be bent, twisted, canted, or extend along a curved, arcuate, or irregular path. The one or more air directors may meander along a curved, winding, or tortuous path. The one or more air directors may have an elongated S-shape or Z-shape, C-shape. The one or more air directors may have an arc shape. The one or more air directors mimic or complement a shape or curve of the impeller of the air mover.

The one or more air directors may have a proximal end and a distal end. The proximal end may be an and of the air director that is located closed to a center axis A and the distal end may be located farthest from the center axis A. The proximal and distal ends may be located in different planes or may be offset relative to each other. The one or more air directors may extend along a linear line or axis between the proximal and distal ends. The one or more air directors may extend along a meandering, curved, winding, axis between the proximal and distal end. In a clockwise direction, the proximal end may be a leading end of the air director and the distal end may be a trailing end of the air director, or vice versa.

All of the air directors may have generally the same height. One or more of the air directors may have different heights from each other. One or more of the air directors may have a generally uniform height extending from the bottom of the wall. In other configurations, the heights of the one or more air directors may be different. For example, an air director may be taller (extending from the wall) in a region closer to the central axis vs than in a region further away from the central axis, or vice versa. A height of the one or more air directors may generally follow a profile or slope of the wall defined between the flange and the central region. The plurality of air directors may resemble spirals on a back or bottom side of the corresponding portion of the connector. A height of the one or more air directors may correspond to (i.e., generally the same as) a thickness or height of the open space in the bag structure and/or a height or thickness of the middle layer.

The plurality of air directors may be radially arranged around a central region of the connector or the portion of the connector. The plurality of air directors may be spaced equidistantly from one another around the central region. The plurality of air directors may be spaced non-equidistantly from one another around the central region. This means the gaps between adjacent air directors may be different between the various adjacent air directors.

The one or more air directors may contact an adjacent surface of the second portion of the connector. This may assist with preventing the connector, spacer layer, open space, or a combination thereof from collapsing or blocking the aperture to restrict or prevent obstruction of air flow into and out of the insert and/or air mover. The one or more air directors may contact the central region of the second portion of the connector. The one or more air directors may be free of any contact with the central region of the second portion of the connector.

In some configurations, one or more air directors may be provided on the second or bottom portion of the connector.

The connector may include a second portion. The second portion may be referred to as a bottom portion. The second portion may function to at least partially close or seal the second connector aperture defined in the bottom layer of the aperture. The second portion may be cup shaped, saucer shaped, bowl shaped etc. The second portion may include a flange and a central region. The flange and the central region of the second portion may be located different planes. The flange and the central region may be connected together with a wall. When the flange and central region are located in the same plane, the wall connecting the flange and central portion is substantially flat. However, the wall may also be curved, stepped, angled, or sloped.

The flange of the second portion may be used for attaching or connecting the second portion, the connector, or both to the insert, the bottom layer, middle layer, or a combination thereof. The flange may be connected to the bottom layer, middle layer, or a combination thereof via one or more adhesives, fasteners, welding, RF welding, pins, rivets, glues, snaps, or a combination thereof. The flange may be connected to the inner surface of the bottom layer or to the bottom or middle layer, or both.

The wall of the second portion may be a sloped wall. The wall of the second portion may slope inwardly towards a central axis, which may be the same axis as the axis that all connector apertures defined in the layers of the insert are aligned with. In some configurations, the flange, and the central region of the second portion may be located in the same plane such that the second portion has a generally flat overall profile. The sloped wall may be at an angle of about 15 degrees or more between the flange and the central region, 30 degrees or more, 45 degrees or more, 60 degrees or more. The sloped wall may have one or more steps between the flange and the central region, or the sloped wall may be generally smooth.

The connector, the second portion, the central region of the second portion, or a combination thereof may include an air mover connection feature. The air mover connection feature may function to engage the air mover, the inlet/outlet of the air mover, the housing, or a combination hereof. The air mover connection feature may provide a connection means, interface, and/or region for attaching the air mover to the insert so that air does not leak or seep out between the air mover housing and the insert, the open space, or a combination thereof. The air mover connection feature may include one or more ribs, cutouts, threads, undercuts, twist locks, or other connectors for engaging the air mover. The air mover connection feature may include one or more gaskets to compress or engage the housing to restrict or prevent air leakage therebetween.

The first and second portions may contact each other after the connector and/or the insert and/or the thermal system are assembled. The first and second portions may be free of any contact with each other each other after the connector and/or the insert and/or the thermal system are assembled.

In some configurations, one or both of the portions may include connecting features for joining or connecting together the first and second portions. These connecting features may be ribs, standoffs, barbs, etc. that may extend between the two portions, through the open space, and possibly through the middle layer. The connecting features may function to maintain the two portions in a snap-fit connection to prevent separation. The connecting features may also ensure that the openings or apertures extending through the layers are not obstructed under the weight of a passenger or object acting on the seat, insert, and/or thermal system.

One or both of the connector portions may be self-locating. This means that the portions may fit themselves into the corresponding connector aperture defined in the corresponding layer of the insert.

The thermal system and/or the insert may include one or more air movers. The one or more air movers may function to move air. The air mover may push, blow, or exhaust air. The air mover may pull, suck, suction, or draw in air. The air may be moved towards or away from the seat, towards or away from an occupant in the vehicle seat, or both. The one or more air movers may move, push, or blow air towards an occupant in the seat. The one or more air movers may move, pull, suck, suction, or draw air away from an occupant in the seat. The air may be ambient air having a generally similar temperature to the air surrounding the seat. The air may be conditioned air. Conditioned air may be air that is generally warmer relative to the surrounding, ambient air. Conditioned air may be air that is generally cooler relative to the surrounding, ambient air. The air mover may be an axial fan, a radial fan, a centrifugal fan, or a combination thereof.

The one or more air movers may include a thermoelectric device (TED). The TED may heat or warm air as it enters the air mover or as it leaves the air mover. The TED may cool air as the air enters the air mover or as the air leaves the air mover. The TED may be used to heat air and/or cool air that is blown onto the user. The one or more air movers may include a heating device, a cooling device, or both (i.e., a thermoelectric device (TED)). For example, the TED and/or air mover may be used in any manner or any configuration with an insert described in any of U.S. Pat. Nos. RE38,128; 4,923,248; 6,629,724; 6,676,207; 6,857,697; 6,869,139; 6,869,140; 6,976,734; 7,083,227; 7,213,876; 7,338,117; 7,356,912; 7,475,938; 7,506,938; and 7,587,901 or U.S. Patent Application Publication No. 2009-0218855 the teachings of which are expressly incorporated by reference herein for all purposes.

The air mover may have a housing. One or more impellers may be contained in the housing. The air mover, the housing, or both may have one or more air inlets through which air is drawn into the housing and one or more air outlets through which air is expelled from the housing. The housing may guide and/or redirect air between one or more inlets and one or more outlets of the air mover.

The air mover, housing, or both may have an inlet and/or an outlet. The inlet and outlet may be the same aperture (i.e., when the fan is operable in a push and pull configuration). The inlet/outlet is configured to engage the insert, the bottom layer, the connector, the second portion of the connector, or a combination thereof. The inlet/outlet may directly engage an air mover connecting feature provided on the connector, the central region of the second portion of the connector.

Figure 1:
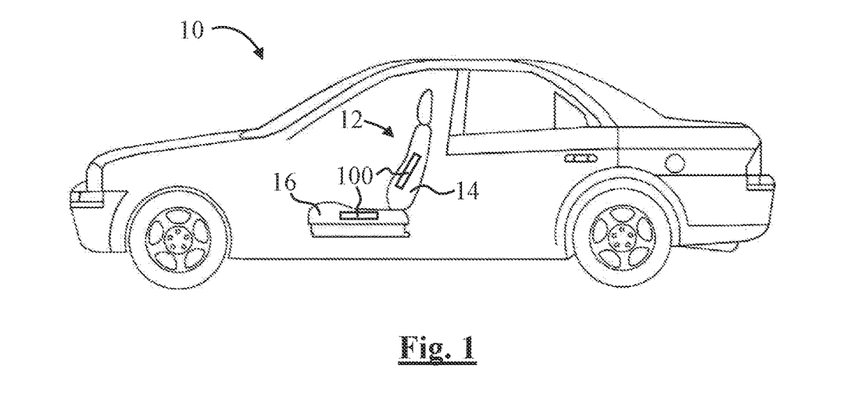
FIG. 1 is a side view of a vehicle and a vehicle seat.

FIG. 1 illustrates a vehicle 10. The vehicle 10 comprises one or more vehicle seats 12. Each vehicle seat 12 may include a back portion 14 and a seat portion 16. The vehicle 10, the vehicle seat 12, the back portion 14 and/or the seat portion 16 may include one or more thermal systems 100.

Figure 2:
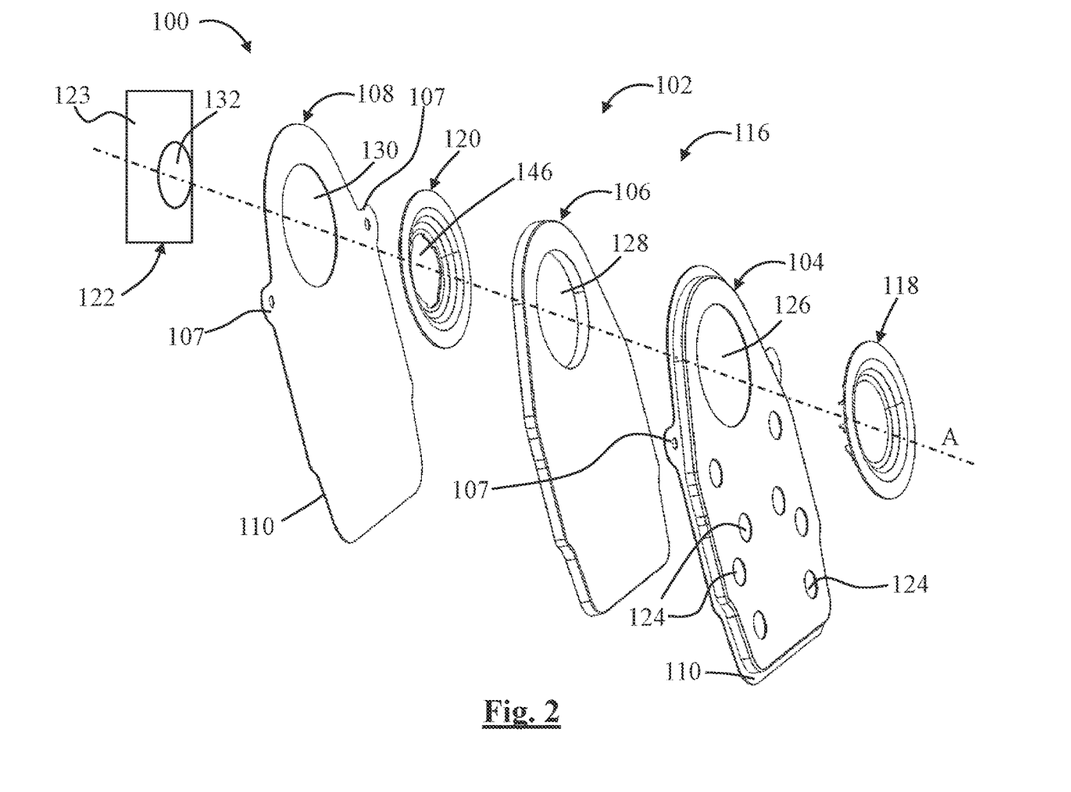
FIG. 2 is an exploded view of a thermal system.

FIG. 2 illustrates a thermal system 100. The thermal system 100 comprises a seat insert 102. The seat insert 102 comprises one or more layers that may include: a first or top layer 104, a middle layer 106, and a second or bottom layer 108. With additional reference to FIG. 8, the top and bottom layers 104, 108 may be joined together at their edges or peripheries 110 to form the bag structure 112. The bag structure 112 includes an open space 114 defined between the layers 104, 108 and within which the middle layer 106 is located.

One or both of the layers 104, 108 may include attachment features 107 for attaching the thermal system 100, the seat insert 102, or both to a support structure, such as one or more portions of the vehicle seat 12 or vehicle 10.

The thermal system 100 and/or insert 102 comprises a connector 116. The connector 116 comprises a first or top portion 118 and a second or bottom portion 120. The thermal system 100 and/or insert 102 comprises an air mover 122 having a housing 123 and an inlet/outlet 132.

The top layer 104 comprises one or more ventilation apertures 124. When the system 100 is operating in a pull mode, an air flow may be drawn into the bag structure 112 through the one or more ventilation apertures 124. When the system 100 is operating in a push mode, an air flow may be exhausted and/or expelled out of the bag structure 112 via the one or more ventilation apertures 124.

The top layer 104 comprises a top layer connector aperture 126 configured to be engaged by and/or receive the first portion 118 of the connector 116. The middle layer 106, which may also be referred to as a spacer layer, includes a middle layer aperture 128. The bottom layer 108 comprises a bottom layer connector aperture 130 configured to be engaged by and/or receive the second portion 120 of the connector 116.

When the thermal system 100 is assembled, the layer apertures 126, 128, 130, the inlet/outlet 132 of the air mover 122, and an aperture 146 of the second portion 120 of the connector 116 described further below may be aligned along a common axis A.

Figures 3, 4, 5:
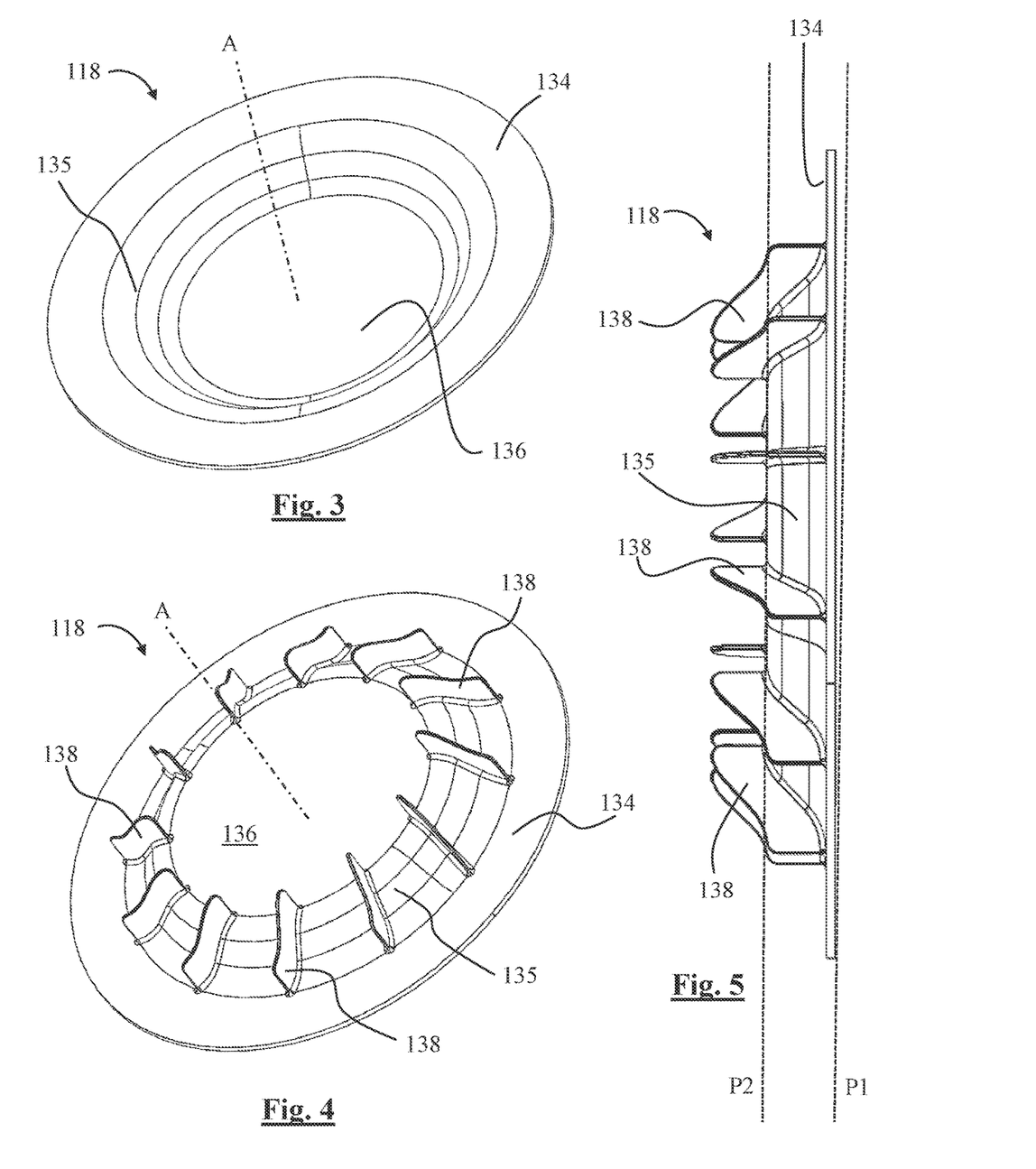
FIG. 3 is a front perspective view of a first portion of a connector.
FIG. 4 is a rear perspective view of a first portion of a connector.
FIG. 5 is a side view of a first portion of a connector.

FIGS. 3-5 illustrate the first portion 118 of the connector 116. The first portion 118 comprises a first or top flange 134 surrounding a first or top central region 136. The first central region 136 may be offset or separated from the first flange 134 via a wall 135. The wall 135 is angled or slopes inwardly, towards the center axis A in a direction from the first flange 134 to the central region 136. The first flange 134 may be located in a first plane P1, the central region 136 may be located in a second plane P2 that is different from the first plane P1. The central region 136 may be free of any apertures. However, in some configurations, the central region may include one or more ventilation apertures.

The wall 135 or the back side of the first portion 118 includes one or more air directors 138. The one or more air directors 138 may be a plurality of air directors 138 radially arranged around central region 136 and/or the sloped wall 135. The one or more air directors 138 may be equally spaced around the axis A. The one or more air directors 138 may be unequally or randomly spaced around the axis A. A length of each of the air directors 138 may be substantially equal or the same. A length of each of the air directors 138 may vary or be different.

The one or more air directors 138 may be curved or arcuate, and may bend or curve or swirl in a direction towards the central axis A. The one or more air directors 138 may function to bend, twist, guide, swirl, and/or redirect the air flow passing through the seat insert and/or the apertures 128, 130 in a direction of the air mover 122. Such bending, twisting, swirling, or guiding of the air flow by the air directors 138 helps minimize or eliminate the air flow from directly hitting any planar walls and/or the impeller of the air mover 122, which may thus lower, reduce, or eliminate noise, vibrations, and/or pressure losses that may occur if the air flow directly hits or contacts any planar walls and/or the impeller of the air mover 122.

Figure 6:
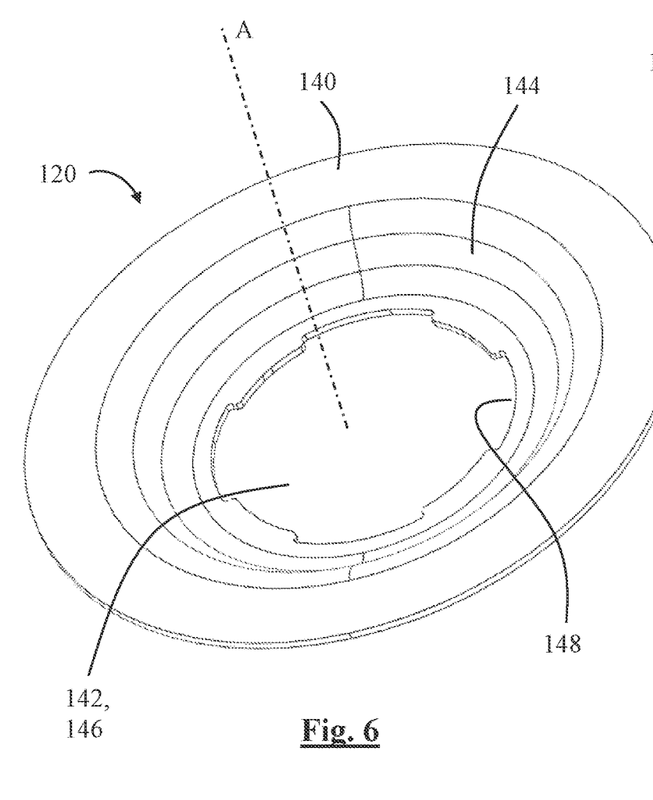
FIG. 6 is a front perspective view of a second portion of a connector.
Figure 7:
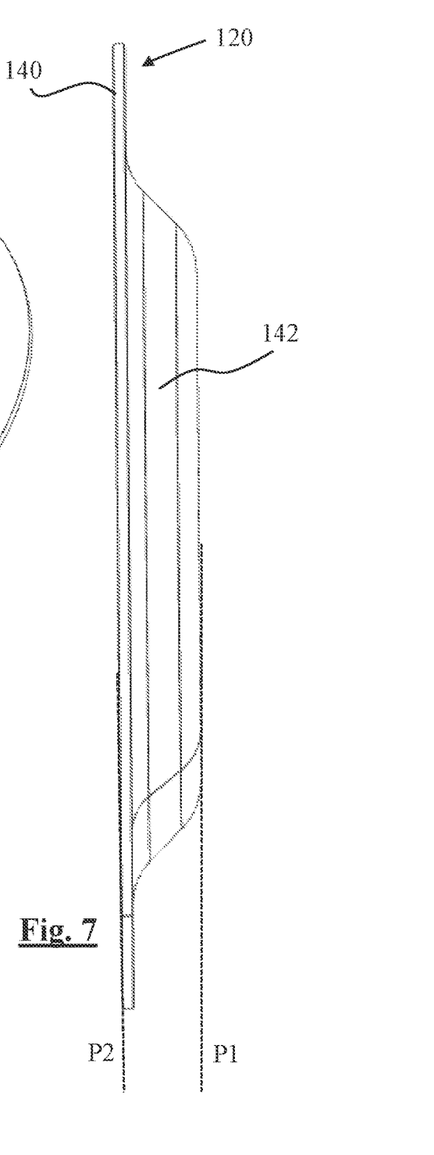
FIG. 7 is a side view of a second portion of a connector.

FIGS. 6-7 illustrate the second portion 120 of the connector 116. The second portion 120 comprises a second or bottom flange 140 surrounding a second or bottom central region 142. The second flange 140 may be located in a first plane P1, the central region 142 may be located in a second plane P2 that is different or offset from the first plane P1. The two structures 140, 142 and/or planes P1, P2 may be separated by wall 144. The wall 144 may be angled or slope inwardly, in a direction towards the center axis A from the second flange 140 to the central region 142. The second portion 120 and/or the bottom central region 142 comprises an aperture 146 for moving air into and/or out of the connector or insert 102, depending on whether the system 100 is operating in a push or pull mode. The second portion 120 and/or the aperture 146 comprises one or more air mover connection features 148 for engaging the air mover 122 (not illustrated). The one or more air mover connection features 148 may be recesses, notches, or other features in the second portion 120, and/or the aperture 146 that may engage and/or retain the air mover 122.

Figure 8:
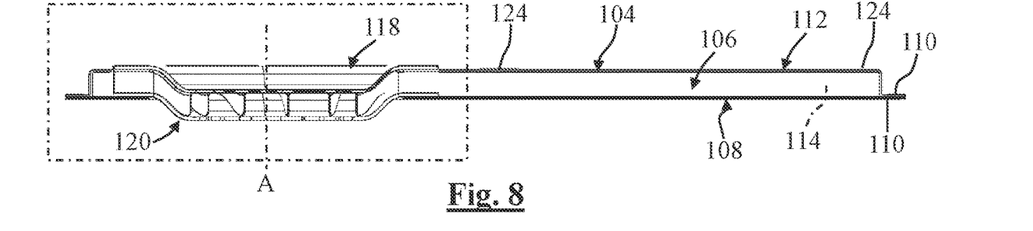
FIG. 8 is a cross-sectional view of the thermal system.
Figure 9:
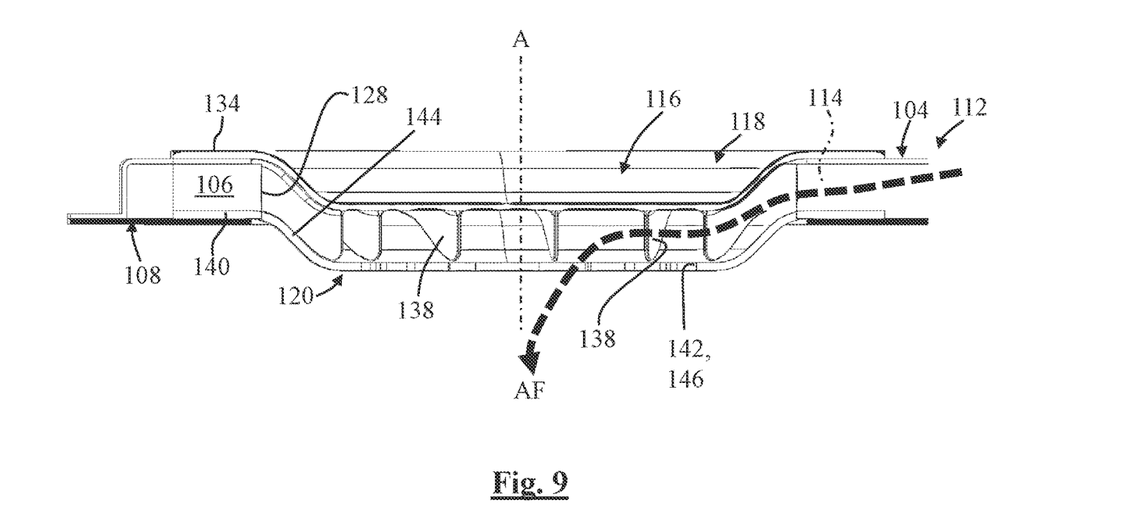
FIG. 9 is a detailed view of a portion of the thermal system of FIG. 8.

FIGS. 8-9 illustrate the assembled seat insert 102. The flange 134 of the first portion 118 of the connector 116 may be attached to the first or top layer 104. The flange 134 may be attached by a suitable method or means, such as with one or more adhesives, fasteners, welding, etc. Alternatively, the flange 134 and/or first portion 118 may be placed against the first or top layer 104 without any fasteners or attachment devices.

The middle layer 106 is located within the open space 114 defined in the bag structure 112. Again, the bag structure 112 is created by way of connecting together the first and second layers 104, 108. The middle layer 106 may be placed into the open space 114 without securing to one or both of the layers 104, 108. Alternatively, the middle layer 106 may be secured to one or both of the layers by a suitable method or means, such as with one or more adhesives, fasteners, welding, stitches, etc.

The flange 140 of the second portion 120 of the connector 116 may be connected to the second or bottom layer 108. More specifically, the second flange 140 is located within the open space 114 of the bag structure 112 and may be located between the middle layer 106 and the bottom layer 108. In this regard, the second layer 108 may be attached or connected to an outer surface of the bottom flange 140 and/or the bottom flange 140 may be attached or connected to an inside surface of the bottom layer 108 and/or the bottom flange 140 may be attached or connected to the middle layer 106.

In the assembled configuration, one or more of the air directors 138 on the first portion 118 of the connector 116 may be in contact with the second or bottom portion 120 of the connector 116. Alternatively, in the assembled configuration, one or more of the air directors 138 may be free of any contact with the second or bottom portion 120 of the connector 116. As perhaps best shown in FIG. 9, a height of the one or more air directors 138 may be substantially the same as a height or thickness of the middle layer 106 and/or the open space 114. Alternatively, a height of the one or more air directors 138 may be slightly smaller or shorter than a height or thickness of the middle layer 106 and/or the open space 114

During use, an air flow AF may be drawn into the seat insert 102 or bag structure 112 through the one or more ventilation apertures 124 defined in the top layer 104. The air flow AF may be drawn into the insert 102 or bag structure 112 via the air mover 122 (See FIG. 2) that is attached to the insert 102 or bag structure 112 via the connector 116.

The air flow AF may be guided into the open space 106 of the insert or bag structure and through one or more channels defined in the middle layer 106. The air flow AF may then contact the one or more air directors 138, which may twist, guide, and/or bend the air flow AF in a direction of the aperture 146 in the second portion 120 of the connector 116. The air directors 138 may serve as guides to maintain the air flow AF while the air enters the region of the sloped wall 144 of the second portion 120 and then into the central region 142 thus bending the air flow AF before the air flow AF enters the air mover inlet/outlet 132 (FIG. 2). The pre-twisting or bending of the air flow AF and navigating/directing the air flow AF into the air mover 122 advantageously avoids the air flow AF from hitting or contacting an impeller of the air mover 122 directly and abruptly, which allows the air to flow smoothly through the air mover 122. This advantageously results in less noises and pressure losses of the air moving through the system.

In a reverse configuration, if the system is operating in a push mode, the air flow AF may be directed from the air mover 122 into the insert 102 or bag structure 112 through the aperture 146 in the second portion 120 of the connector. The air flow AF may be deflected, twisted, or guided by the one or more air directors 138 to flow into the open space 114 and towards the one or more ventilation apertures 124 before being ejected or exhausted from the insert 102 or bag structure 112 through the one or more ventilation apertures 124 defined in the top layer 104. Before being ejected, the air flow AF may be conditioned by passing the air over or through one or more heaters and/or coolers to warm and/or cool the air, respectively.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

The invention claimed is:

1. A thermal system for a vehicle seat comprising:
a seat insert having a bag structure;
an air mover adapted to generate an air flow through the seat insert; and
a connector connecting the air mover to the seat insert, the connector having one or more air directors extending into the bag structure of the seat insert; and
wherein the one or more air directors are configured to change a direction of the air flow within the seat insert.

2. The thermal system according to claim 1, wherein one or more of the one or more air directors are ribs having an arcuate, curved, or S-shape.

3. The thermal system according to claim 1, wherein the connector comprises a first portion and a second portion, and the one or more air directors are a plurality of air directors that are radially arranged around a central region of the first portion.

4. The thermal system according to claim 3, wherein the first portion comprises a flange and a sloped wall extending between the flange and the central region, wherein one or more of the plurality of air directors are arranged on the sloped wall.

5. The thermal system according to claim 4, wherein the first portion of the connector is free of any apertures.

6. The thermal system according to claim 3, wherein an inlet/outlet of the air mover is aligned along an axis with the central region of the first portion.

7. The thermal system according to claim 3, wherein the one or more air directors are a plurality of air directors that are equally spaced around the central region of the first portion.

8. The thermal system according to claim 3, wherein the plurality of air directors are curved in the same direction.

9. The thermal system according to claim 1, wherein the seat insert comprises a top layer, a middle layer, and a bottom layer, the middle layer comprises a middle layer aperture through which the one or more air directors extend.

10. The thermal system according to claim 9, wherein the top layer comprises a top layer aperture, and during assembly of the thermal system, the one or more air directors are passed through the top layer aperture.

11. The thermal system according to claim 9, wherein the connector comprises a first portion and a second portion, the one or more air directors are a plurality of air detectors that are radially arranged around the first portion, and the second portion of the connector is located between the middle layer and the bottom layer, the second portion of the connector has an air mover connection feature for connecting to the air mover.

12. The thermal system according to claim 11, wherein the second portion comprises a flange that is attached to the bottom layer, the middle layer, or both.

13. The thermal system according to claim 12, wherein the second portion comprises a sloped wall between the flange of the second portion and the air mover connection feature.

14. The thermal system according to claim 11, wherein the air mover connection feature comprises a plurality of notches extending around a central aperture.

15. The thermal system according to claim 11, wherein the top layer and the bottom layer are joined together to form e the bag structure.

16. The thermal system according to claim 1, wherein the seat insert comprises one or more ventilation apertures.

17. The thermal system according to claim 1, wherein the connector comprises a first portion and a second portion, wherein the first portion is supported on an outside surface of the bag structure and the second portion is located within the bag structure.

18. The thermal system according to claim 17, wherein the first portion has a flange that rests on a top surface of the bag structure; the first portion has a sloped wall that includes the one or more of the air directors, the one or more air directors guide the air flow.

19. The thermal system according to claim 17, wherein the first portion has a central region which is a closed wall that is free of any apertures, which is located on the same side of the bag structure that includes one or more ventilation apertures.

20. The thermal system according to claim 19, wherein the second portion has an air mover connection feature for connecting the air mover to the connector and the seat insert.

\* \* \* \* \*